United States Patent [19]

Roubinet

[11] 3,999,793
[45] Dec. 28, 1976

[54] ENERGY ABSORBING BUMPER

[75] Inventor: Pierre Roubinet, Billancourt, France

[73] Assignees: Regie nationale des Usines Renault; Automobiles Peugeot, both of France

[22] Filed: Dec. 14, 1972

[21] Appl. No.: 314,982

[30] Foreign Application Priority Data

Dec. 15, 1971 France .............................. 71.45055

[52] U.S. Cl. ................................. 293/91; 156/162; 267/139; 267/149; 293/62; 293/71 R; 293/87; 293/98

[51] Int. Cl.[2] ................. B31C 13/00; B60R 19/06; B60R 19/08; B61F 19/04

[58] Field of Search ............ 179/100.2 C; 267/140, 267/149, 139; 293/64, 71 R, 72, 1, 19, 60, 70, 71 P, 62, 87, 91, 98, 99; 310/12; 324/43 R; 152/359; 156;162/

[56] References Cited

UNITED STATES PATENTS

| | | | |
|---|---|---|---|
| 1,380,759 | 6/1921 | Whitaker, Jr. | 293/71 P |
| 1,457,259 | 5/1923 | Malluk et al. | 293/62 |
| 1,615,046 | 1/1927 | Shaw | 293/98 X |
| 1,627,472 | 5/1927 | Watson | 293/71 P |
| 1,754,112 | 4/1930 | Lusse | 293/62 |
| 2,799,494 | 7/1957 | Pollock | 267/140 |
| 3,074,751 | 1/1963 | Gerin | 293/19 |
| 3,142,598 | 7/1964 | Rosen | 156/162 |
| 3,158,765 | 11/1964 | Polgreen | 310/12 |
| 3,219,333 | 11/1965 | Derschmidt et al. | 267/149 |
| 3,315,722 | 4/1967 | Marzocchi et al. | 152/359 |
| 3,352,588 | 11/1967 | Stancliffe | 293/72 |
| 3,493,257 | 2/1970 | Fitzgerald et al. | 293/71 R |
| 3,519,763 | 7/1970 | Lode | 179/100.2 C |
| 3,603,633 | 9/1971 | Eshelman | 293/19 |
| 3,606,434 | 9/1971 | Barton et al. | 293/64 |
| 3,677,318 | 7/1972 | Glass et al. | 152/359 |
| 3,692,345 | 9/1972 | Dumontier | 293/71 R |
| 3,734,557 | 5/1973 | McKenzie | 293/71 R |

FOREIGN PATENTS OR APPLICATIONS

| | | | |
|---|---|---|---|
| 802,530 | 10/1958 | United Kingdom | 156/162 |
| 1,069,782 | 5/1967 | United Kingdom | 156/162 |
| 1,134,033 | 11/1968 | United Kingdom | 156/162 |
| 189,036 | 1/1967 | U.S.S.R. | 324/43 R |

Primary Examiner—Robert J. Spar
Assistant Examiner—Howard Beltran
Attorney, Agent, or Firm—Stevens, Davis, Miller & Mosher

[57] ABSTRACT

Energy absorption elements for automotive vehicles are obtained by winding filaments in the form of a continuous wire impregnated with polymerizable resin in such a manner that the turns are wound parallel to one another in horizontal planes about a detachable core of complementary contour, so as to obtain a member having a closed-loop contour; the energy absorption elements may constitute closed-contour members for producing two or more automobile bumpers cutting said elements at predetermined locations.

4 Claims, 8 Drawing Figures

ENERGY ABSORBING BUMPER

This invention relates to shock-absorbing devices for automobile vehicles and has specific reference to bumpers or fenders, mainly of the shield type consisting essentially of a sheet of reinforced synthetic material.

Improved complex fenders are already known which comprise ancillary members having a resilient or shock-absorbing function. Thus, conventional bumpers have been associated with hydraulic cylinders, inflatable elements filled with gas or liquid, spring means, breakable elements, etc., which are intended to absorb a certain fraction of the energy released during a crash between the vehicle and an obstacle. Although these various improved arrangements cannot be considered as inefficient, their structures are generally heavy, complicated and therefore expensive, with a variable capacity of energy absorption.

It is the primary object of the present invention to provide a simple yet economical fender structure capable of displaying considerable energy absorbing and elastic properties in case of shocks produced within a predetermined energy range below the rupture threshold of the material employed. The bumper according to this invention for the above-defined purpose consists essentially of elements obtained by the so-called filament winding process, possibly embedded in a mass of synthetic material or, according to a modified form of embodiment, incorporating deformable parts.

The invention will now be described with reference to the attached drawing illustrating, by way of example but not of limitation, various forms of embodiment of automotive fenders. In the drawing.

Figure 1:
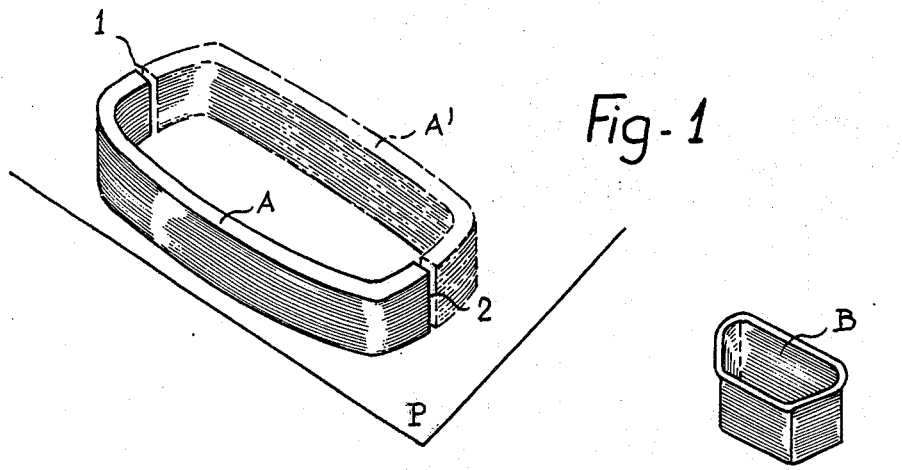
FIG. 1 illustrates a pair of bumpers in which a continuous glass wire impregnated with polymerizable resin is used to form parallel turns on a detachable core until a closed-loop element is obtained.

Referring first to FIG. 1, it will be seen that a pair of bumpers A, A' are obtained simultaneously by winding a continuous glass filament impregnated with polymerizable resin such as a suitable and standard polyester on a core of suitable shape in planes parallel to the plane P, so that the turns are substantially parallel to one another. After the resin polymerization is achieved by using a suitable polymerizing agent, possibly with the application of heat, and removing the shaping core, the resulting product is cut at 1 and 2 in order to obtain a pair of fender blades A and A'.

By way of example, a mixture comprising 50 % of glass by volume, and 50 % of polymerizable polyester resin, having a volume mass of 1.9 kg/cu.dm. (0.0686 lb.p.cu.in.), has a flexion stress limit of 100 kg f/sq.mm. (142,230 psi) and a modulus of elasticity of 4,000 kg f/sq.mm. (5,689,200 lbs.sq.in.).

Figure 2:
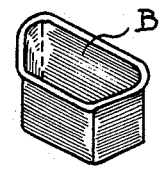
FIG. 2 illustrates a member for fastening the bumper to the vehicle, this member being obtained by said filament winding process, wherein the glass filament coated with polymerizable resin is wound about a core of adequate outer contour.

This invention is also concerned with the problem of fastening bumper to a motor vehicle by means of members such as B (FIG. 2) also acting as energy absorption elements. These members B are obtained in the same fashion as members A, A', that is, by winding a filament about a core having an outer contour corresponding to the inner contour of the part to be obtained, the filament consisting of a glass wire impregnated with polymerizable resin.

Figure 3:
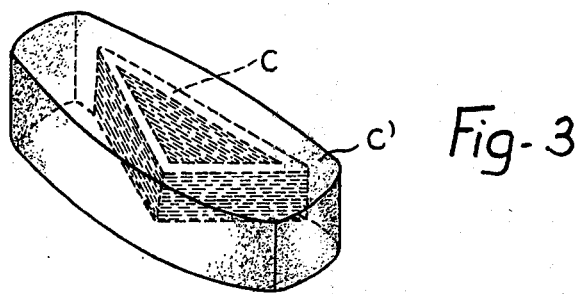
FIGS. 3 and 4 are modified forms of embodiment wherein the energy absorption capacity of the device of this invention as depicted hereinafter with reference to FIGS. 1 and 2 is improved through their combination with a mass having a relatively high coefficient of energy absorption.
Figure 4:
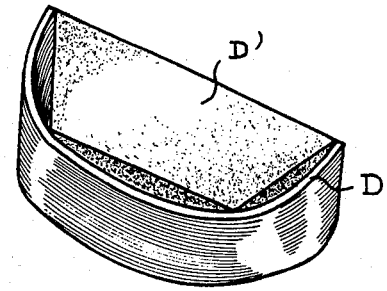
Figure 5:
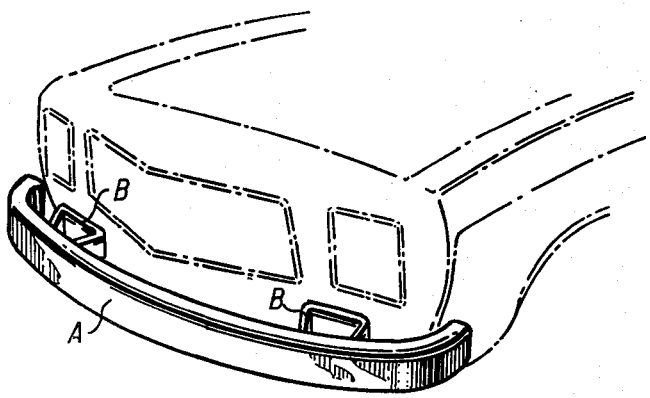
FIG. 5 shows the bumper of FIG. 1 fastened to the vehicle by means of the fastening members of FIG. 2.
Figure 6:
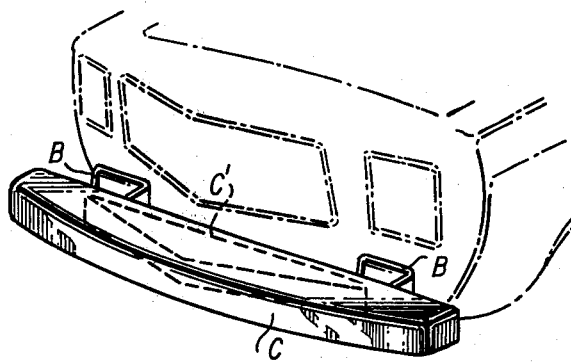
FIG. 6 shows the bumper of FIG. 3 fastened to the vehicle by the fastening members of FIG. 2.
Figure 7:
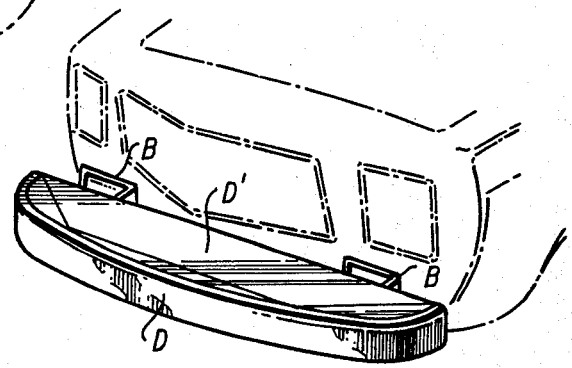
FIG. 7 shows the bumper of FIG. 4 fastened to the vehicle by the fastening members of FIG. 2.

FIGS. 3 and 4 illustrate modified forms wherein the energy absorption capacity of members C, D obtained like the above-described members A and B is multiplied through their combination with a mass C', D' also having a high energy absorption coefficient.

This mass C', D' may be in the form of a semirigid block of synthetic material such as polyurethane foam in the case of FIG. 3 or a partitioned, honeycomb-structured mass, made from sheets of synthetic or metallic material, in the case of FIG. 4.

As illustrated in FIG. 3, the element C obtained by winding the filament on a triangular core is placed in a mold into which the cellular foam material constituting the other part C' is cast. Alternatively, in FIG. 4 the impregnated filaments D are wound directly on the core D' of cellular or foam material which remains permanently in the member.

The parts illustrated in FIGS. 3 and 4 may constitute elements such as over-rides or any shock-absorbing beading disposed within the passenger compartment of the vehicle, such as the instrument panel, arm-rests, head-rests, etc . . . .

These elements may also be used as members for assembling the bumpers to the vehicle body as in the case of the aforementioned members B.

Figure 8:
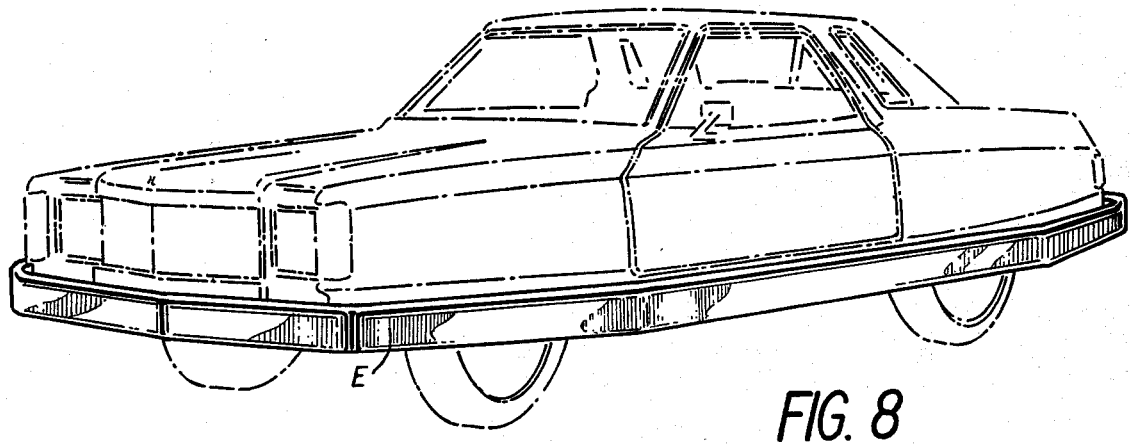
FIG. 8 shows a further embodiment wherein the bumper encircles the vehicle.

Finally, as shown in FIG. 8, it may also be contemplated without departing from the basic principle of the present invention to provide a one-piece ring-shaped insert E obtained by the same filament winding process and disposed at the level of the vehicle chassis in order to constitute a complete protection belt therearound.

Obviously, such a belt having the general contour of the vehicle will be formed integrally with the front and rear bumpers and the lateral protection elements.

Of course, various modifications and variations will occur to those skilled in the art when carrying out the present invention, without departing from the basic principles thereof as set forth in the appended claims.

What is claimed as new is:

1. An energy absorbing device, primarily for use with automotive vehicles, comprising: a bumper formed of a plurality of turns of a filamentary material impregnated with a polymerizable material, said plurality of turns being wound substantially parallel to one another in horizontal planes to form a closed loop and a foam energy absorbing material substantially surrounding said closed loop; said device further comprising further closed loop members formed of a plurality of turns of filamentary material impregnated with a polymerizable material for fastening said bumpers to said vehicle.

2. An energy absorbing device, primarily for use with automotive vehicles, comprising: a bumper formed of a plurality of turns of a filamentary material impregnated with a polymerizable material, said plurality of turns being wound substantially parallel to one another in horizontal planes about a permanent core member to form a closed loop, wherein said core member comprises a foam energy absorbing material at least partially surrounded by said closed loop; said device further comprising further closed loop members formed of a plurality of turns of filamentary material impregnated with a polymerizable material for fastening said bumpers to said vehicle.

3. An energy absorbing device, primarily for use with automotive vehicles, comprising: a plurality of turns of a filamentary material impregnated with a polymerizable material, said plurality of turns being wound substantially parallel to one another in horizontal planes about a removable core and thereafter cut to form a pair of substantially similar complementary members, wherein said complementary members constitute respective bumpers for an automotive vehicle; said device further comprising further closed loop members formed of a plurality of turns of filamentary material impregnated with a polymerizable material for fastening said bumpers to said vehicle.

4. An automotive vehicle having an energy absorbing device mounted thereon, said energy absorbing device comprising: a plurality of turns of a filamentary material impregnated with a polymerizable material, said plurality of turns being wound substantially parallel to one another in horizontal planes about a removable core to form a closed loop member, wherein said closed loop member has a general contour complementary to a circumference of said automotive vehicle and is mounted on said vehicle to form a protection belt encircling said vehicle, said device further comprising further closed loop members formed of a plurality of turns of filamentary material impregnated with a polymerizable material for fastening said protection belt to said vehicle.

* * * * *